United States Patent
Wei et al.

(10) Patent No.: US 10,824,717 B2
(45) Date of Patent: Nov. 3, 2020

(54) DYNAMIC BINARY TRANSLATION TO SECURE PROCESSES FROM SPECULATIVE ROGUE CACHE LOADS

(71) Applicant: VMware, Inc., Palo Alto, CA (US)

(72) Inventors: Michael Wei, Palo Alto, CA (US); Dan Tsafrir, Sunnyvale, CA (US); Nadav Amit, Mountain View, CA (US)

(73) Assignee: VMWARE, INC., Palo Alto, CA (US)

( * ) Notice: Subject to any disclaimer, the term of this patent is extended or adjusted under 35 U.S.C. 154(b) by 121 days.

(21) Appl. No.: 16/004,191

(22) Filed: Jun. 8, 2018

(65) Prior Publication Data

US 2019/0243966 A1 Aug. 8, 2019

Related U.S. Application Data

(60) Provisional application No. 62/627,064, filed on Feb. 6, 2018.

(51) Int. Cl.

| G06F 21/54   | (2013.01) |
| G06F 21/57   | (2013.01) |
| G06F 21/52   | (2013.01) |
| G06F 12/1009 | (2016.01) |
| G06F 12/14   | (2006.01) |
| G06F 21/74   | (2013.01) |

(52) U.S. Cl.
CPC .......... *G06F 21/54* (2013.01); *G06F 12/1009* (2013.01); *G06F 12/1441* (2013.01); *G06F 21/52* (2013.01); *G06F 21/577* (2013.01); *G06F 21/74* (2013.01); *G06F 2212/1044* (2013.01); *G06F 2212/1052* (2013.01); *G06F 2212/657* (2013.01); *G06F 2221/034* (2013.01)

(58) Field of Classification Search
CPC ......... G06F 21/54; G06F 21/74; G06F 21/577
See application file for complete search history.

(56) References Cited

U.S. PATENT DOCUMENTS

| 7,281,102 | B1 * | 10/2007 | Agesen ................. G06F 12/145 711/163 |
| 7,620,821 | B1   | 11/2009 | Grohoski et al. |
| 8,183,452 | B2 * | 5/2012  | Shirahama ............... G10H 7/00 84/602 |
| 8,522,239 | B1   | 8/2013  | Dobrovolskly et al. |
| 8,776,223 | B2   | 7/2014  | Balakrishman et al. |
| 9,578,032 | B2 * | 2/2017  | Beveridge ........... G06F 9/45558 |
| 9,665,498 | B2 * | 5/2017  | Kiriansky ............... G06F 12/10 |
| 10,002,084 | B1  | 6/2018  | Warkentin |
| 10,002,484 | B2 * | 6/2018 | Takeda ................... B65H 43/04 |
| 10,621,342 | B2  | 4/2020  | Johnson et al. |
| 10,635,823 | B2  | 4/2020  | Gutson et al. |

(Continued)

OTHER PUBLICATIONS

Notice of Allowance, dated Nov. 19, 2019, from a related application.

(Continued)

*Primary Examiner* — Ali Shayanfar

(57) ABSTRACT

In accordance with embodiments of the present disclosure, a binary translator can perform address shifting on the binary code of an executing application. Address shifting serves to shift the addresses of memory operations that can access locations in the kernel address space into address locations in the user space, thus avoiding speculative access into the kernel address space.

12 Claims, 13 Drawing Sheets

(56) References Cited

U.S. PATENT DOCUMENTS

| | | | | |
|---|---|---|---|---|
| 2002/0147970 | A1* | 10/2002 | Smith | G06F 8/443 717/140 |
| 2006/0010440 | A1* | 1/2006 | Anderson | G06F 9/45533 718/1 |
| 2010/0031325 | A1* | 2/2010 | Maigne | G06F 9/45533 726/4 |
| 2011/0161620 | A1* | 6/2011 | Kaminski | G06F 12/1009 711/207 |
| 2013/0117530 | A1 | 5/2013 | Kim et al. | |
| 2015/0100791 | A1* | 4/2015 | Chen | G06F 12/1408 713/189 |
| 2016/0179547 | A1* | 6/2016 | Yamada | G06F 9/3806 712/239 |
| 2016/0285896 | A1* | 9/2016 | Caprioli | G06F 21/556 |
| 2017/0171213 | A1* | 6/2017 | Beveridge | G06F 9/45558 |
| 2017/0286110 | A1* | 10/2017 | Agron | G06F 9/30145 |
| 2018/0088988 | A1* | 3/2018 | Rabet | G06F 21/00 |
| 2018/0095765 | A1* | 4/2018 | Mekkat | G06F 9/3834 |
| 2019/0057040 | A1 | 2/2019 | Jiang | |

OTHER PUBLICATIONS

Notice of Allowance, dated Mar. 17, 2020, from a related application, U.S. Appl. No. 16/004,191.

Notice of Allowance, dated Mar. 12, 2020, from a related application, U.S. Appl. No. 16/016,254.

Notice of Allowance dated Aug. 26, 2020, from related U.S. Appl. No. 16/004,180, filed Jun. 8, 2018.

* cited by examiner

```
        # while ( u[ j] == k )
loop:   LI R1, u              # load starting address of array u into R1
        LW R2, j              # load index j into R2
        ADD R3, R2, R1        # store address of u[j] into R3
        LW R4, (R3)           # load u[j] into R4 from RAM address in R3
        LW R5, k              # load test value k into R5
        BNE R4, R5, end j += 1
        LW R5, j              # load index j into R5
        ADD R6, R5, 1         # increment index j
        SW R6, j
        BR loop               # next iteration
end:    <next op>
```

*loop* and *end* are labels that represent locations in the listing
*u, j, k* are labels that represent locations (not shown) in the listing

FIG. 6

```
while ( u[j] == k )
    j += 1;
```

FIG. 7 address shifting code, 902

```
       # while ( u[ j] == k )
loop:  LI R1, u              # load starting address of array u into R1
       LW R2, j              # load index j into R2
       ADD R3, R2, R1        # store address of u[j] in R3
       LI R7, 0xFFFFF000     # load kernel address space
       BLE R7, R3, ok        # do not mask when R7 ≤ R3
       AND R3, 0x00000FFF
ok:    LW R4, (R3)           # load u[j] into R4 from RAM address in R3
       LW R5, k              # load test value k into R5
       BNE R4, R5, end j += 1
       LW R5, j              # load index j into R5
       ADD R6, R5, 1         # increment index j
       SW R6, j
       branch loop           # next iteration
end:   <next op>
```

FIG. 9

```
         # while ( u[ j] == k )
loop:    LI R1, u              # load starting address of array u into R1
         LW R2, j              # load index j into R2
         ADD R3, R2, R1        # store address of u[j] in R3
         LI R7, 0x00000FFF     # load kernel address space
         BGT R7, R3, ok        # do not mask when R7 > R3
         OR R3, 0xFFFFF000
ok:      LW R4, (R3)           # load u[j] into R4 from RAM address in R3
         LW R5, k              # load test value k into R5
         BNE R4, R5, end j += 1
         LW R5, j              # load index j into R5
         ADD R6, R5, 1         # increment index j
         SW R6, j
         branch loop           # next iteration
end:     <next op>
``` address shifting code, 1102

FIG. 11

DYNAMIC BINARY TRANSLATION TO SECURE PROCESSES FROM SPECULATIVE ROGUE CACHE LOADS

CROSS REFERENCE TO RELATED APPLICATION

Pursuant to 35 U.S.C. § 119(e), this application is entitled to and claims the benefit of the filing date of U.S. Provisional App. No. 62/627,064 filed Feb. 6, 2018, the content of which is incorporated herein by reference in its entirety for all purposes.

This application is related to the following commonly owned and concurrently filed applications, the content of each of which is incorporated herein by reference in its entirety for all purposes:

- U.S. application Ser. No. 15/960,467, filed Apr. 23, 2018, entitled "32-bit Address Space Containment to Secure Processes From Speculative Rogue Cache Loads"
- U.S. application Ser. No. 16/016,254 filed Jun. 22, 2018, entitled "Separate Cores to Secure Processes From Speculative Rogue Cache Loads"
- U.S. application Ser. No. 16,004,180 filed Jun. 8, 2018, entitled "Compilation-Time Checks to Secure Processes From Speculative Rogue Cache Loads"

BACKGROUND

The "meltdown" hardware security vulnerability enables unprivileged processes to read inaccessible kernel memory by exploiting speculative execution. Generally, a malicious user can trick the CPU into speculatively accessing u[j], such that u is a user array and j is some private data of the kernel that is unknown to the user. Because u[j] is now cached in user-space, the user can deduce the value of j by timing access to u's elements. The vulnerability affects microprocessors from Intel, IBM, and ARM released over the last two decades. Fixing the vulnerability will have a cost in terms of real dollars that may eclipse the Y2K bug. Unlike Y2K, fixing meltdown will have a lasting performance impact, as patching it requires establishing barriers to speculation and isolating the kernel.

Meltdown is made possible because operating systems traditionally map the kernel's address space into the process page tables of every process for efficiency; in other words, the virtual address space of each process includes the user address space for that process and the kernel address space. System designers rely on hardware protection to prevent unauthorized user access by marking the kernel memory pages as privileged. Unfortunately, on meltdown-vulnerable CPUs, a user process can speculatively access these privileged kernel pages, thereby leaking kernel data indirectly. With instruction pipelining, for example, data from an unauthorized address can be temporarily loaded into the CPU's cache during out-of-order execution. This cache presents a side-channel attack opportunity that allows an unprivileged process to bypass the normal privilege checks that isolate that process from accessing data belonging to the operating system. As a consequence, the unprivileged process can read data from any address that is mapped to the current process' virtual address space, including the kernel's address space.

The canonical defense against meltdown recommended by CPU vendors is to separate the kernel and user into two different address spaces. This technique, known as "page table isolation" (PTI), is employed in various operating systems including BSD, Linux, OS X, and Windows. Whereas current systems have a single set of process page tables for each process, PTI uses implements two sets of process page tables. One set is essentially unchanged; it includes both kernel-space and user-space addresses, but it is only used when the system is running in kernel mode. The second set contains a copy of all of the user-space mappings, but leaves out much the kernel side. Instead, there is a minimal set of kernel-space mappings that provides the information needed to handle system calls and interrupts, but no more. Whenever a process is running in user mode, the second set of process page tables will be active. The bulk of the kernel's address space will thus be completely hidden from the process, defeating the known hardware-based attacks. Whenever the system needs to switch to kernel mode, in response to a system call, an exception, or an interrupt, for example, a switch to the first set of process page tables will be used.

PTI has been shown to reduce the performance of some workloads by as much as 30% or more. Especially affected are workloads that frequently make system calls into the kernel and must therefore suffer PTI overhead associated with context switching. Presumably, meltdown could be fixed in future processors, potentially without a performance penalty. But it would be impractical if not impossible to fix the billions of processors already in service due to the hardware nature of the vulnerability. The situation is especially dire for embedded, real-time applications which use meltdown-vulnerable processors, such as avionics, railway controls, medical, industrial control, and other time-sensitive systems. These safety-critical systems may have been deployed with the expectation that the processor would operate in a fixed performance envelope, an assumption which may no longer hold if PTI is enabled for those systems.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 6 and 7 show an example of computer executable instructions for a code fragment to explain the operation of the binary translator.

FIG. 9 illustrates an example of insertion of address shifting code in accordance with the present disclosure.

FIG. 11 illustrates an example of insertion of address shifting code in accordance with some embodiments of the present disclosure.

DETAILED DESCRIPTION

In accordance with the present disclosure, the binary code of an executing application can be translated to address shift certain memory operations. In some embodiments, for example, memory operations in the binary code can be identified, and address shifting can be incorporated with those memory operations. In some instances, the memory operations can be rewritten with shifted address operands, and in other instances address shifting code can be incorporated with the memory operations. In some embodiments, address shifting can shift addresses that target the kernel space into an address in the user space, thus preventing speculative access into the kernel space. Address shifting obviates the need to employ PTI to mitigate the meltdown vulnerability, since speculative access in into the kernel can be prevented. As a result, performance by the computer can be improved since the penalties of PTI are not incurred.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
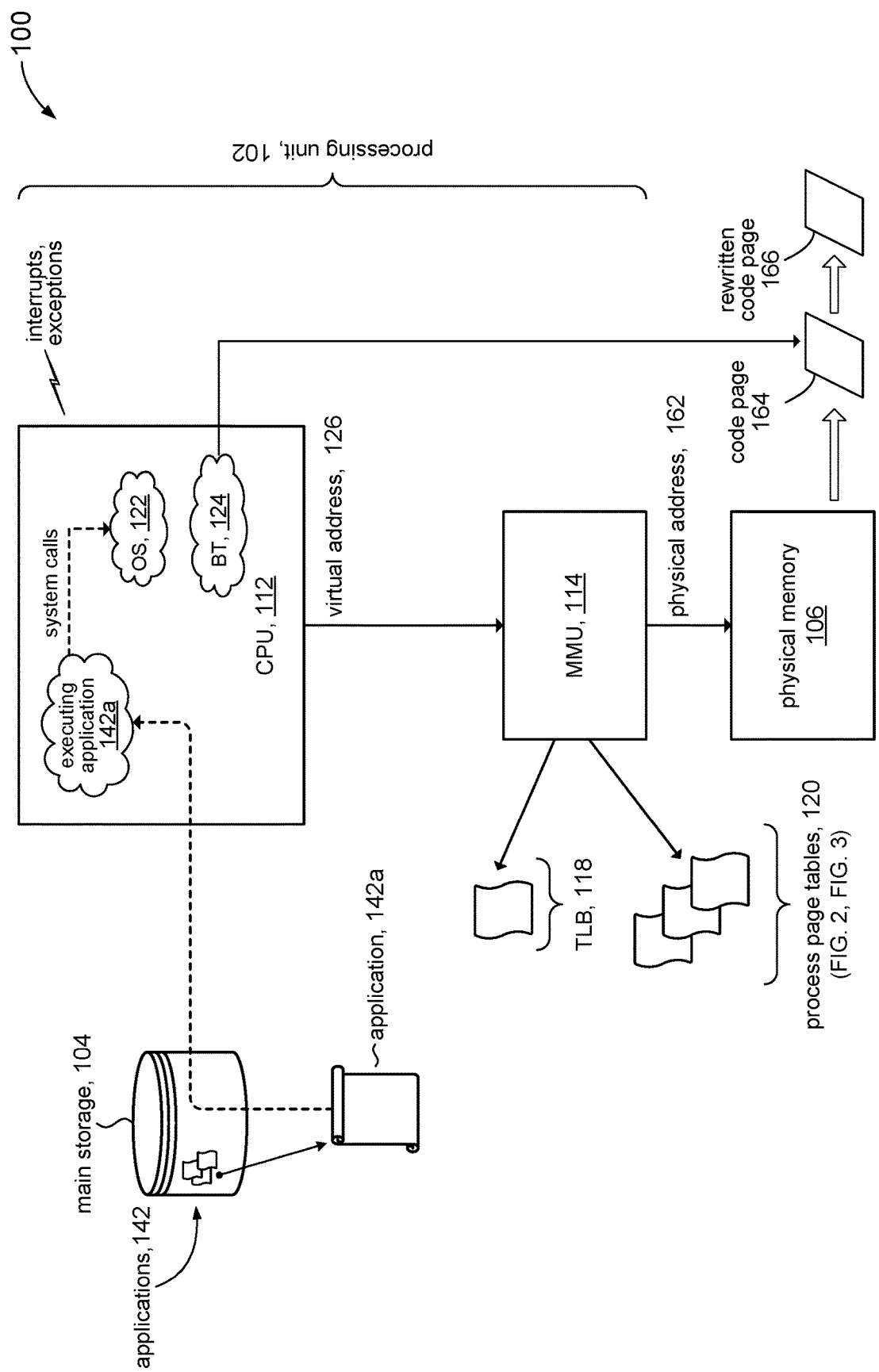
FIG. 1 shows a computer system in accordance with the present disclosure.

FIG. 1 shows an illustrative configuration of a computer system 100 in accordance with some embodiments of the present disclosure. The computer system 100 can include a processing unit 102, main storage 104, and a physical memory 106, among other system elements that are not shown.

The processing unit 102 can include a central processing unit (CPU) 112 or other suitable processing core to receive and execute computer executable machine instructions. The CPU 112 can execute an operating system (OS) 122 comprising a set of such computer executable machine instructions to support the execution of applications 142; for example, to provide system services, handle interrupts and exceptions, and so on.

The processing unit 102 can include a memory management unit (MMU) 114 to provide and support virtual memory using the physical memory 106. The MMU 114 can translate a virtual address 126 from CPU 112 into a physical address 162 that identifies a memory location in physical memory 106. The MMU 114 can maintain a translation lookaside buffer (TLB) 118 to facilitate the translation process. In some embodiments, for example, the TLB 118 can be an associative cache that stores recent translations of virtual addresses to physical addresses to reduce translation time for faster access to physical memory 106.

The processing unit 102 can execute instructions in "kernel mode" (also referred to variously as supervisor mode, privileged mode, etc.) or the processing unit 102 can execute in "user mode." In some embodiments, for example, the CPU 112 can include a set of control registers (not shown) to support the processing unit's operations. A mode bit in one of the control registers can be set (e.g., logic '1') or not set (e.g., logic '0') to control the execution mode.

In addition, the control registers can specify a set of process page tables 120 to support the MMU 114 in translating a virtual address 126 into a physical address 162. Intel® CPUs, for example, have set of control registers to control operation of their CPUs. One register, referred to as CR3, stores the address (pointer) of the root page of the process page tables used by the MMU 114 to map virtual addresses to physical addresses. In accordance with the present disclosure, the OS 122 can define a first virtual address space for the execution application using a first set of process page tables 120a (FIG. 2), and a separate second virtual address space for the executing application (e.g., 142a) using a second set of process page tables 120b (FIG. 3). This aspect of the present disclosure is discussed in more detail below.

The main storage 104 can be any type or form of storage device or medium capable of storing data and/or other computer-readable instructions. For example, main storage 104 can be a magnetic disk drive (e.g., a so-called hard drive), a solid state drive, a floppy disk drive, a magnetic tape drive, an optical disk drive, a flash drive, or the like. In some embodiments, main storage 104 can comprise a removable storage unit to store computer software, data, or other computer-readable information. Examples of suitable removable storage units include, for example, a floppy disk, a magnetic tape, an optical disk, a flash memory device, or the like.

The main storage 104 can store executable applications 142 (binary files) comprising computer executable machine instructions for execution by CPU 112. An executable application 142a, for example, can be loaded into physical memory 106 and executed by CPU 112. When the executable application 142a is executing on the CPU 112 (also referred to as a "process" at this point), the application can make system calls into the OS 122 to perform tasks such as reading or writing data, communicating with other devices, and so on.

The physical memory 106 can be any type or form of storage device or medium capable of storing data and/or other computer-readable instructions. Examples of physical memory 106 include, for example, random access memory (RAM), flash memory, or any other suitable memory device.

An operating system (OS) 122 can be loaded on the CPU 112 for execution. The operating system (OS) 122 can be configured to support the execution of executable applications 142, to handle interrupts and exceptions, and so on. A non-privileged user executable application 142a can be loaded on CPU 112 for execution. The user executable application 142a is non-privileged in that it does not have full access to the address space of the OS (kernel address space), nor can it execute in kernel mode. During execution, the executable application 142a can make system calls into the OS 122 to perform kernel mode tasks such as reading or writing data, communicating with devices, and so on.

The computer executable machine instructions comprising an executable application 142a can be accessed from main storage 104, which are stored in physical memory 106 in units of physical memory pages, referred to as code pages (e.g., 164), and mapped to the virtual address space of the executable application. In accordance with the present disclosure an accessed code page 164 can be initially marked for no execution. As a result, when the CPU 112 attempts to read instructions in a such code page for execution, the read attempt will raise an exception which in turn will invoke an exception handler. In accordance with the present disclosure, the exception handler can be a binary translator 124 that rewrites the code page 164 to produce a rewritten code page 166. This aspect of the present disclosure is discussed below.

Figure 2:
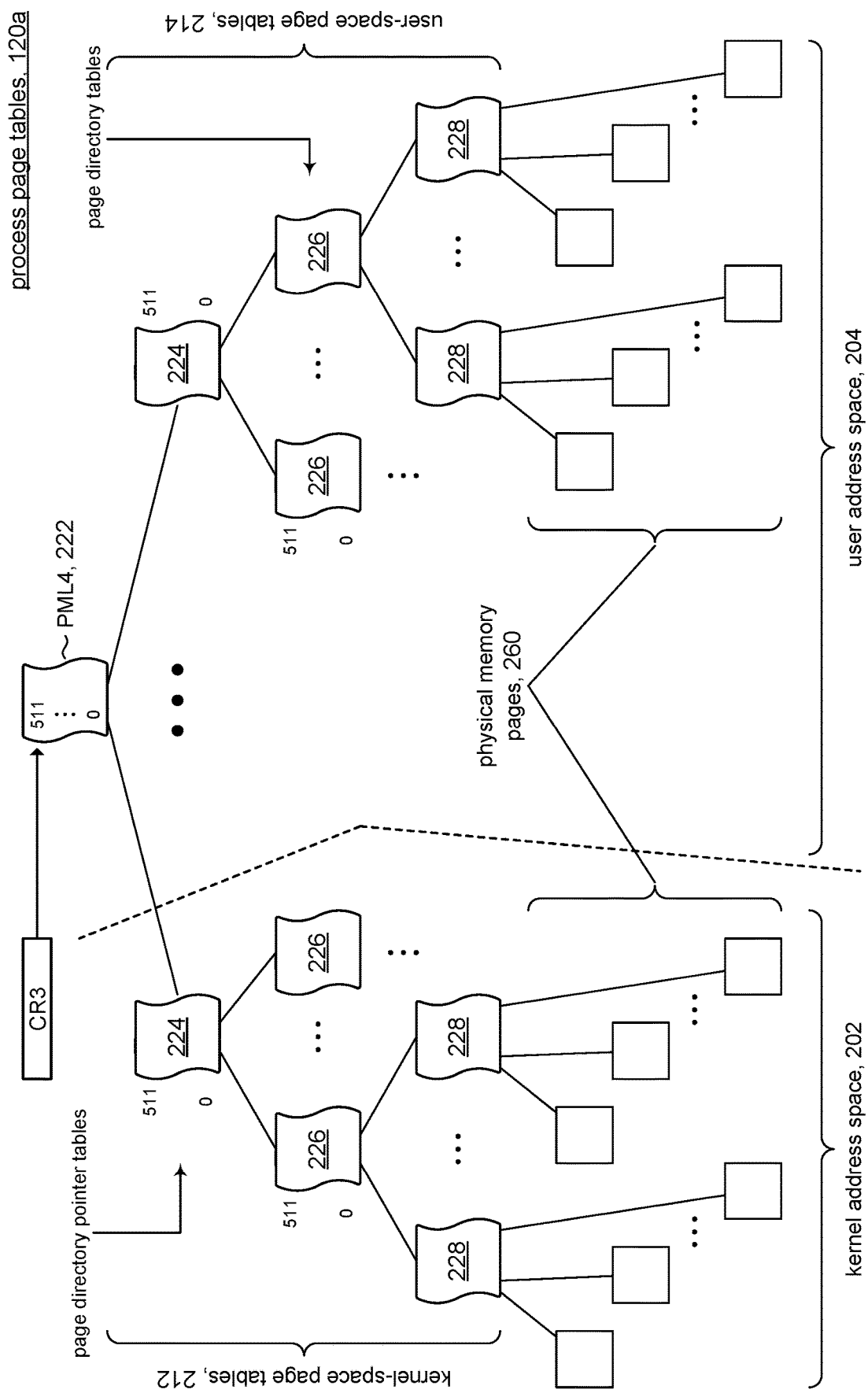
FIG. 2 illustrates an example of process page tables used to define a virtual address space without page table isolation.
Figure 3:
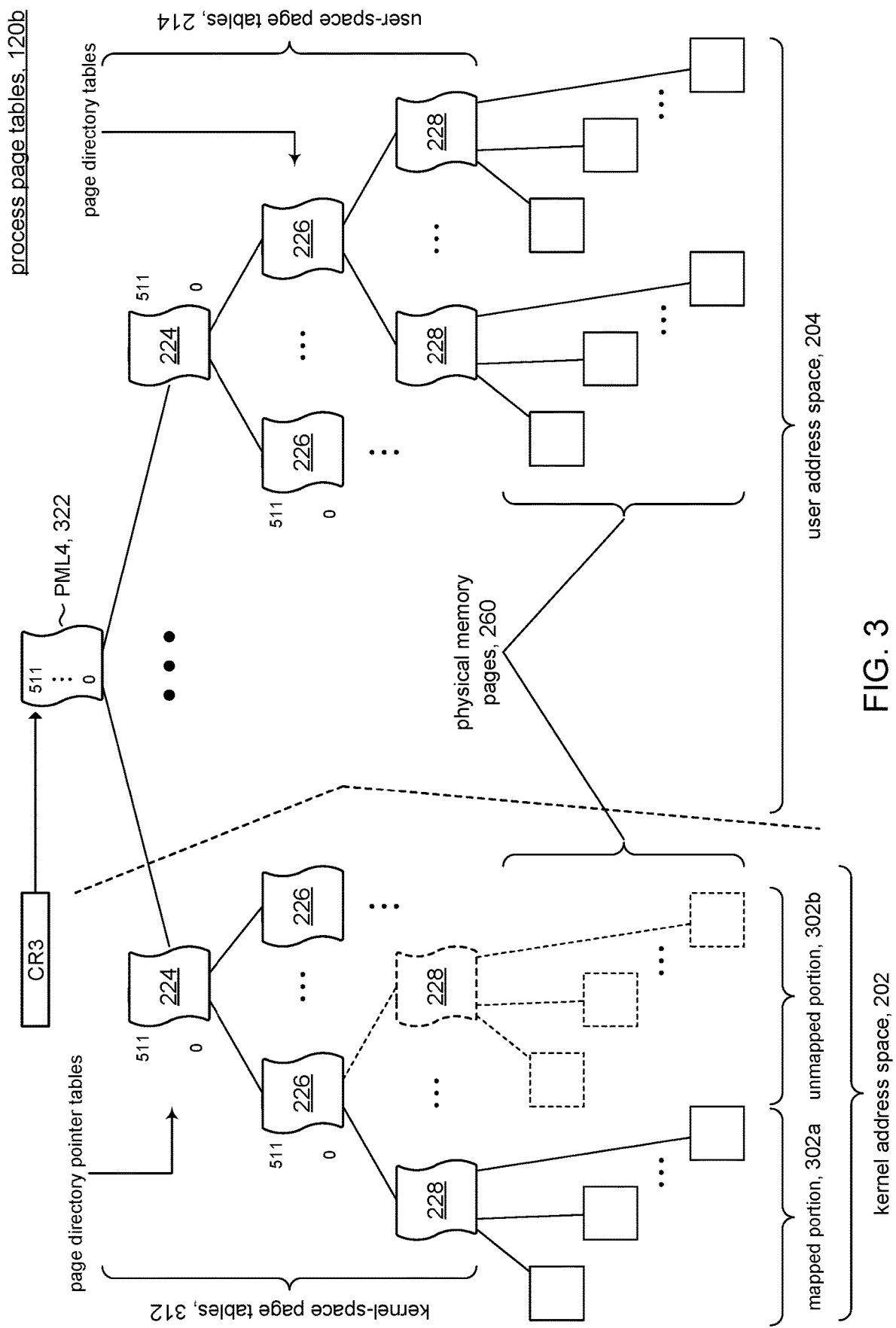
FIG. 3 illustrates kernel and user address spaces during context switching without page table isolation.

FIG. 2 shows an illustrative example of a set of process page tables 120a to define a first virtual address space for the application. The MMU 114 can use the process page tables 120a to perform virtual address to physical address translation on behalf of the OS. In some embodiments, the MMU 114 can divide the virtual address space (the range of addresses used by the processor) into pages, each having a size which is a power of 2, usually a few kilobytes, but they can be much larger.

The process page tables 120a can divide the virtual address space into a kernel address space 202 and a user address space 204. The kernel address space 202 is reserved for the OS 122 and privileged processes. The user address space 204 is unique to each process; e.g., a given process (e.g., executable application 142a) will have a user address space that cannot be accessed by another process. The memory mapping tables that are associated with the kernel address space 202 can be referred to generally as the kernel-space page tables 212. Likewise, the memory mapping tables that are associated with the user address space 204 can be referred to generally as the user-space page tables 214.

The process page tables 120a can be organized in a hierarchy of memory mapping tables, which in some embodiments can be stored in physical memory 106. In some embodiments, the hierarchy comprises four levels of memory mapping tables. Each memory mapping table in the hierarchy comprises 512 table entries (e.g., indexed from 0-511), so 9 bits would be used to index each memory mapping table. It will be appreciated that in other embodiments the memory mapping tables can be defined with different size parameters.

The top-most (root) memory mapping table 222 in the hierarchy can be referred to as PML4 (page map level 4). Table entries in PML4 222 can include pointers (physical memory addresses) to the next level memory mapping tables 224, which in some embodiments are referred to as "page directory pointer" tables. Table entries in the page directory pointer tables 224 can include pointers to the third level memory mapping tables 226, which in some embodiments are referred to as "page directory" tables. Table entries in the page directory tables 226 can include pointers to the fourth level memory mapping tables 228, which in some embodiments are referred to as "page" tables. Table entries in the page tables 228 can include pointers to pages (physical memory pages) 260 of physical memory 106. A description of virtual to physical address translation using the process page tables 120a is discussed below.

The user address space 204 addresses those portions of physical memory 106 that a process has read and write access to. Access to portions of physical memory 106 that map to the kernel address space 202 are generally restricted to the OS 122 and privileged processes. Accordingly, access attempts to the kernel address space 202 by an unprivileged process executing in user mode can raise exception events in the CPU. In some embodiments, for example, the memory mapping tables can include a bit (not shown) or other information that indicates a given physical memory page 260 is mapped to the kernel address space 202. When the processor 102 is executing in user mode, an access to that physical memory page 260 can raise an exception (e.g., from MMU 114, FIG. 1), which can be handled by the OS 122 (e.g., the OS can "kill" the offending process).

In accordance with the present disclosure, the process page tables 120a shown in FIG. 2 define the full virtual address space. In other words, PTI is disabled and the process page tables 120a map the entire user address space 204 of a given process and the entire kernel address space 202 to physical memory 106. It is understood that there is a set of process page tables 120a for each process. More particularly, the process page tables 120a for given process comprise a set of user-space page tables 214 that is unique to that process, since each process has its own user address space. It is noted, on the other hand, that the set of kernel-space page tables 212 defines a kernel address space that is common to each process since the OS 122 uses the same kernel address space.

Referring to FIG. 3, in accordance with the present disclosure a second virtual address space can be defined for an executing application. In particular, the second virtual address space can be defined using PTI-enabled for process page tables. FIG. 3 shows an illustrative example of a set of process page tables 120b that can be used to define a second virtual address space for a process (e.g., executable application 142a). In some embodiments, for example, the root page 322 can point to kernel page tables 312 that map at most only a portion 302a of the entire kernel address space 202, while pointing to user-space page tables 214 that map the entire user address space 204 of the process.

The mapped portion 302a of the kernel address space 202 represents that portion of the kernel address space 202 which contains a small amount of kernel ("trampoline") code needed to provide system call entry and exit points, interrupt handling (e.g., interrupt descriptor table), exception handlers, and the like. The unmapped portion 302b of the kernel address space 202 represents that portion of the kernel address space 202 that should be isolated from the process to prevent speculative access by that process. Accordingly, page tables corresponding to the unmapped portion 302b of the kernel address space 202 can be omitted from the process page tables 120b of the process, effectively isolating the sensitive unmapped portion 302b of the kernel address space from the process.

Figure 4:
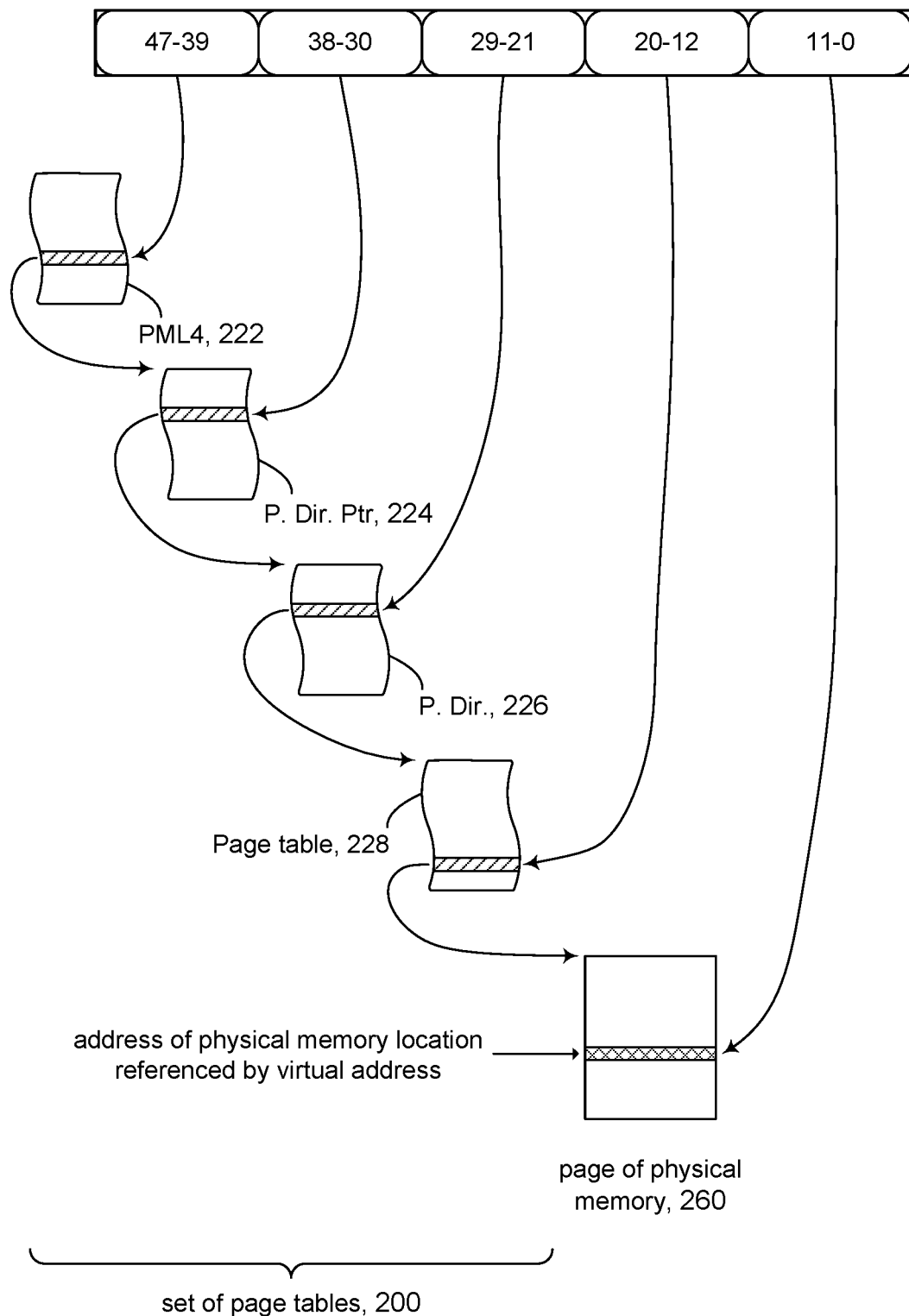
FIG. 4 shows an illustrative example of translating virtual address to a physical address.

Referring to FIG. 4, the discussion will now turn to a brief description of how a virtual address 402 can be translated to a physical address, for example in the MMU 114. The description will use the process page tables 120a (FIG. 2) as a reference. As explained above, the CPU can load a pointer to the process page tables 120a associated with the current process for which virtual addresses are to be translated to physical addresses. We can assume without loss of generality that the virtual address 402 is a 48-bit address. The first nine bits 47-39 of the virtual address 402 serve as an index into the PML4 (top level memory mapping table 222), recalling that in this example the memory mapping tables have 512 entries. The table entry indexed by bits 47-39 points to a page directory pointer table 224. The next nine bits 38-30 of the virtual address 402 serve as an index into the page directory pointer table 224, which stores a pointer to a page directory table 226. Continuing, bits 29-21 are used to index into the page directory table 226 to identify a page table 228. Finally, bits 20-12 index into page table 228 to identify the physical address of the page of physical memory 260. The final bits 11-0 in the virtual address 402 is an offset value that is added to the identified physical address to obtain the address of the physical memory location in physical memory 106 that the virtual address 402 translates to (assuming each page of physical memory 260 is $2^{12}$ bytes).

Figure 5:
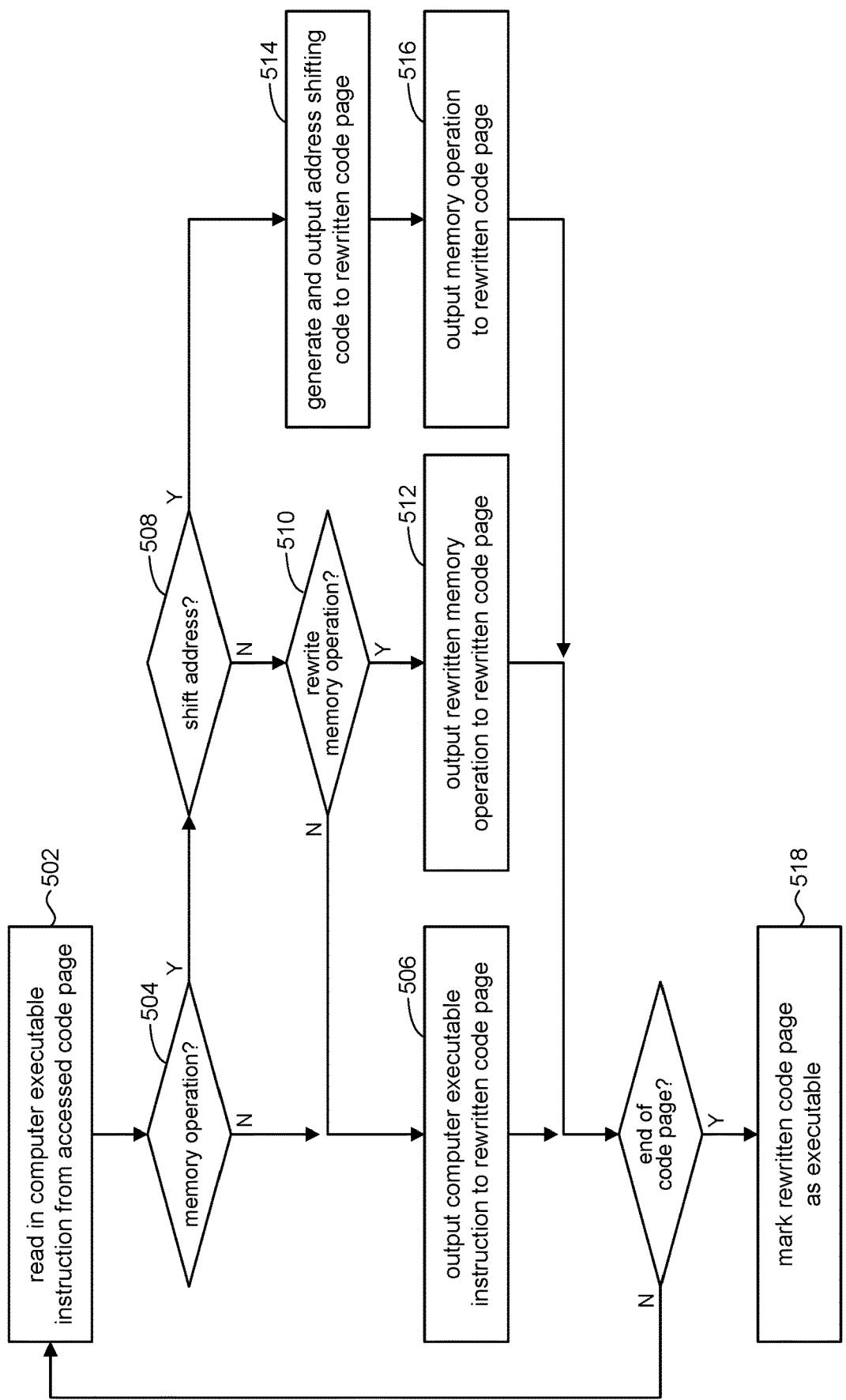
FIG. 5 shows high level operations for a binary translator in accordance with the present disclosure.
Figure 8:
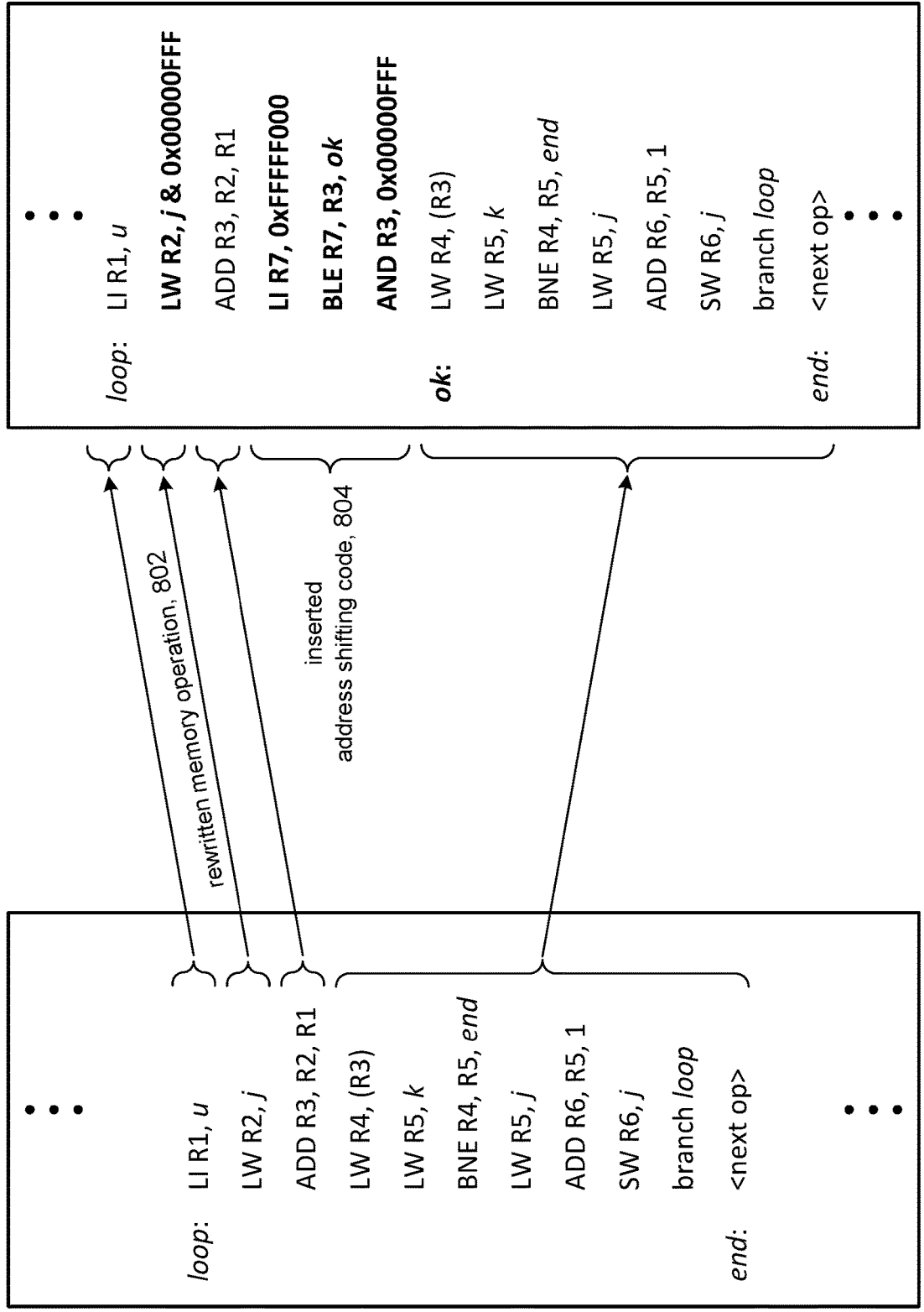
FIG. 8 is an example of the translation process in accordance with the present disclosure.

Referring now to FIG. 5, the discussion will turn to a high level description of processing in a dynamic binary translator (e.g., 124, FIG. 1) in accordance with the present disclosure to perform address shifting to mitigate the meltdown vulnerability when executing an application. As described above, the binary translator can be invoked (e.g., as an exception handler) in response to an access to a code page (e.g., 164) comprising computer executable machine instructions of an executing application where that code page is marked for no execution. Operation of the binary translator yields a rewritten code page (e.g., 166) produced in accordance with the present disclosure that is can be executed by the CPU. The binary translator is dynamic in the sense that it operates during execution of the computer executable machine instructions of the application. FIGS. 6-8 provide examples to illustrate the processing in FIG. 5. FIG. 6 shows an example of computer executable machine instructions for a code fragment, shown in FIG. 7. FIG. 8 illustrates an example of an accessed code page 864 containing the computer executable machine instructions shown in FIG. 6, and an example of a rewritten code page 866 generated in accordance with the present disclosure. The discussion that follows assumes that the CPU has made an access to code page 864 that is marked for no execution, which has resulted in an exception. The processing described is processing of the binary translator (exception handler) which has been invoked in response to the exception.

At operation 502, the binary translator can read in computer executable machine instructions from the accessed code page 864 to produce rewritten code page 866. In some embodiments, for example, the binary translator reads in one computer executable machine instruction at a time from the accessed code page 864, processes it according to the present disclosure, and writes out computer executable machine instructions to the rewritten code page 866. The example of computer executable machine instructions shown in FIG. 6 is represented in a human readable format to facilitate the discussion. The code in FIG. 6 is expressed in a simple form of assembly language (including comments for readability), comprising a simple set conventional assembly instructions, such as:

LI—load immediate
LW—load word
ADD—add instruction
BNE—branch on not equal
SW—swap instruction
BR—unconditional branch At operation 504, the binary translator can analyze each computer executable machine instruction that it reads in to determine if it is a memory operation. A memory operation is an operation that stores data to a memory location or loads data from a memory location. In some embodiments, the binary translator can use a table lookup to determine if the opcode of a computer executable machine instruction is a memory operation or not. In other embodiments, the binary translator can include the front end component of a compiler called a lexical analyzer to process a more sophisticated machine instruction set. If the computer executable machine instruction is a memory operation, then processing proceeds to operation 508, otherwise processing proceeds to operation 506.

At operation 506, the binary translator can copy or otherwise output the computer executable machine instruction that it read in from the accessed code page 864 to the rewritten code page 866 when it is determined at operation 504 to be other than a memory operation. Referring to FIG. 8, for example, the instruction

ADD R3, R2, R1 is an example of a non-memory operation, and so it would be output (copied) to the rewritten code page 866. Processing can continue with the next computer executable machine instruction at operation 502 if there are more computer executable machine instructions in the accessed code page 864; otherwise, processing can continue with operation 518.

At operation 508, the binary translator can analyze a memory operation to determine if address shifting is needed. In some embodiments, for example, the binary translator can analyze the memory operation to determine if the operation uses register addressing where the addresses are stored in registers, and if so then processing proceeds to operation 514. For example, the memory operation in FIG. 8

LW R4, (R3)

uses register addressing to load a word from a memory location whose address is stored in register R3. On the other hand, if the address operand of the memory operation specifies an immediate address, then processing can proceed with operation 510. Referring again to FIG. 8, for example, the memory operations LI R1, u and LW R2, j use immediate addressing. The load immediate instruction (LI) loads the address of u (e.g., 0x0045302e) into register R1 and the load word instruction (LW) loads the content at the memory location of immediate address j.

At operation 510, the binary translator can determine whether to rewrite a memory operation that used immediate addressing based on whether the immediate address specifies a memory location outside or within of the kernel address space; for example, by comparing the address against the address range of the kernel address space. If the address falls outside of the kernel space, then the binary translator can copy the memory operation out to the rewritten code page 866 unchanged, at operation 506. For example, FIG. 8 shows that the binary translator has determined that the u operand in the load immediate instruction LI R1, u specifies an address that is outside of the kernel address space, and so is copied unchanged to the rewritten code page 866. If the address falls within the range of addresses of the kernel space, then processing can continue at operation 512.

At operation 512, the binary translator can replace an immediate addressing memory operation that addresses the kernel space by rewriting it. In some embodiments, for example, the rewritten (replacement) memory operation can shift the address of the memory operation into the user address space. Referring to FIG. 8, assume for the purposes of illustration that the binary translator has determined that the j operand in the load word instruction LW R2, j is an address in the kernel address space. FIG. 8 shows an example of a rewritten memory operation 802 using a new address operand equal to j & 0x00000FFF (assuming 32-bit addressing). As will be explained below (FIG. 10), the mask 0x00000FFF serves to shift the address operand out of the kernel address space. The rewritten memory operation 802 can be written out to the rewritten code page 866 in place of the original memory operation. It will be appreciated that in other embodiments, the binary translator can use any suitable address that is outside the kernel space to rewrite the memory operation. Processing can continue with the next computer executable machine instruction at operation 502 if there are more computer executable machine instructions in the accessed code page 864; otherwise, processing can continue with operation 518.

At operation 514, the binary translator can generate address shifting code 804 for memory operations that use register addressing; see, for example, the memory operation

LW R4, (R3)

in the accessed code page 864 in FIG. 8. In some embodiments, the binary translator can generate address shifting code 804 comprising three operations:

---
LI R7, 0xFFFFF000
BLE R7, R3, ok
AND R3, 0x00000FFF.
---

The register designation R3 would change according the register used in the identified memory operation (in this case LW R4, (R3)). The binary translator can output the address shifting code 802 to the rewritten code page 866.

At operation 516, the binary translator can output the memory operation that triggered generation of the address shifting code 804, which in this example is LW R4, (R3). Thus, the memory operation is output to the rewritten code page 866 in sequence immediately following the address shifting code 804. Processing can continue with the next computer executable machine instruction at operation 502 if there are more computer executable machine instructions in the accessed code page 864; otherwise, processing can continue with operation 518.

At operation 518, the binary translator can mark the rewritten code page 866 as executable and update the process page tables of the executing application to point to the rewritten code page 866 in place of the accessed code page 864. When the CPU resumes execution, it will read instructions from the rewritten code page 866. The memory operations in the rewritten code page 866 are address shifted in accordance with the present disclosure to prevent access to the kernel space when executing in user mode.

As explained above, on meltdown-vulnerable CPUs, a user process can speculatively access the privileged kernel address space, thereby leaking kernel data indirectly. For example, supposing u is a user array and j is a value such that u[j] dereferences to an address in the kernel address space, a malicious process can trick the CPU into speculatively accessing u[j] using the CPU's speculative execution capability in conjunction with the CPU's memory cache, thereby gaining access to private data in the kernel address space. Consider to following user process code fragment:

---
if (u[k] == guess) {
    x = u[0];
}
where u[k] references the kernel space (i.e., private data), and u[0] references the user space.
---

Without speculative execution, the conditional test u[k]==guess would be executed in sequence relative to the rest of the user process code, and the attempt to access u[k] (which is in kernel space) would raise an exception and thus be trapped. However, with speculative execution, the content of u[k] would be accessed without checking permissions in order to speculatively execute the conditional. If the test passes, then the CPU would load u[0] into the cache to operate on it. When finally determines that the speculation was incorrect (due to failed permissions), it leaves u[0] in the cache. If u[0] is in the cache, the user process can conclude that the private data u[k] is guess. The user process can repeat this test using different values for k and guess to probe the kernel address space.

Figure 10:
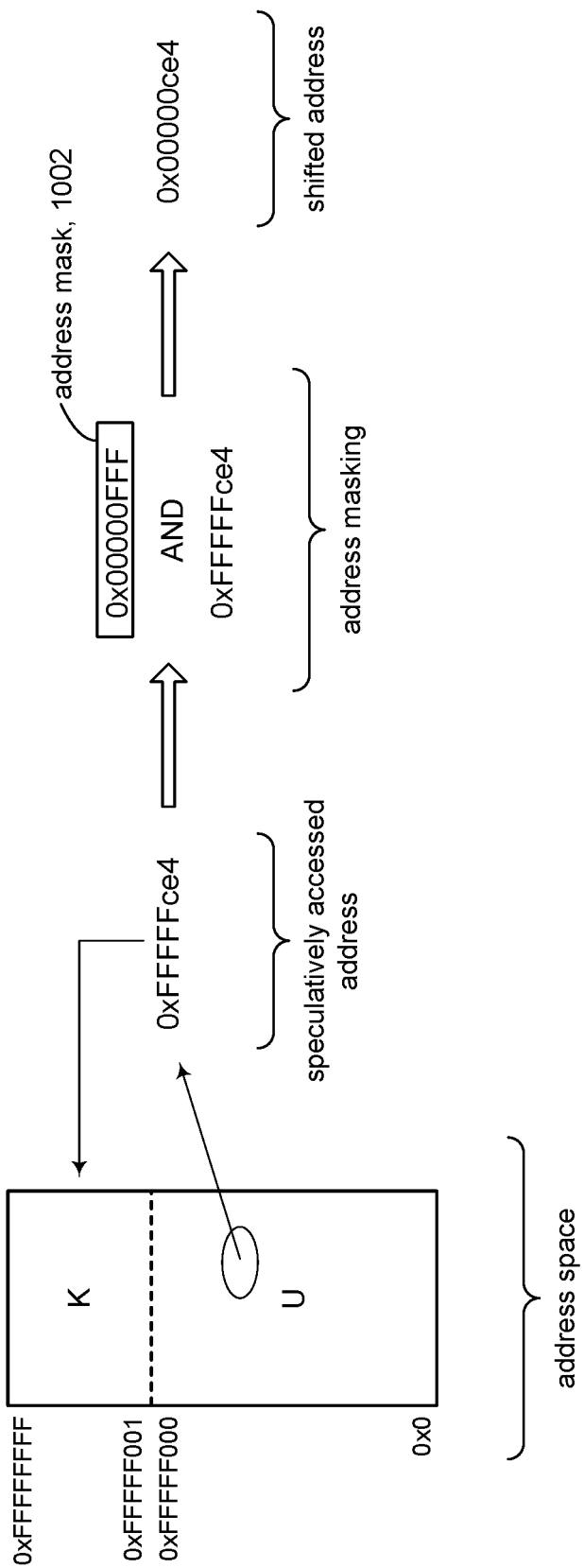
FIG. 10 shows an example of a memory model that explains the operation of the address shifting code of FIG. 9.

Referring now to FIGS. 9 and 10, operation of an example of address shifting code shown in FIG. 8 will be explained in the context of the meltdown vulnerability. The example of address shifting code 902 in FIG. 9 is based on the computer executable machine instructions of FIG. 6. FIG. 10 illustrates an example of the address space for an executing process, comprising a privileged kernel address space K and the user address space U. Suppose the kernel address space K occupies the high end of the address space. FIG. 10, for example, shows the kernel address space having a range of addresses from 0xFFFFF001 to 0xFFFFFFFF (assuming 32-bit addressing). Suppose that the user address space is 0x0 to 0xFFFFF000.

The address shifting code 902, by virtue of being placed just before a memory operation

LW R4, (R3)

can test whether register R3 contains an address that is within the kernel address space (LI and BLE operations). If not, then the branch instruction in the address shifting code 902 will skip the AND operation. If register R3 contains an address that is within the kernel address space, then the AND operation is executed to mask out the range of addresses that belong to the kernel address space, namely any address in the range 0xFFFFFFFF to 0xFFFFF001. FIG. 10, for example, shows an address mask 1002 that will mask the address 0xFFFFFce4 (which is in the kernel address space) to produce 0x00000ce4, effectively shifting the address into the user address space by masking out the high order bits of the address with 0's. It can be appreciated that the address mask 1002 can take on masking values other than shown in FIG. 10 to shift the address from the kernel address space to somewhere in the user address space, thus protecting against attacks into the kernel address space.

Referring to our code fragment example above, address shifting code 902 or the like can be inserted in the instructions comprising the conditional test u[k]==guess. It can be seen that with speculative execution, while the address shifting code may be executed out of order, that code will nonetheless be executed and when executed will mask out kernel address of u[k], thus preventing speculative access to the kernel private data.

As noted above the address shifting code 902 can be any suitable code. Merely to illustrate this point, for example, in other embodiments, the address shifting code can be:

---
CMP R3, 0xFFFFF000
JGE segfault
--- assuming the kernel space is <0xFFFFF000 to branch into a segmentation fault. Still other suitable address shifting code can be used in other embodiments.

As explained above, PTI is the conventional solution for addressing the meltdown vulnerability. However, PTI requires flushing entries in the TLB and updating the TLB each time the process page tables (e.g., 120a, 120b) are changed between PTI-enabled page tables (e.g., 120b, FIG. 3) and PTI-disabled page tables (1201, FIG. 2) during a context switch between kernel mode execution and user mode execution. The flush operation can be a time consuming effort that degrades performance of the computer system. In addition, processing cache misses is a time consuming process because the MMU needs to traverse the hierarchy of memory mapping tables comprising the process page tables, which in a flushed TLB can significantly degrade performance because of the need to repopulate the TLB.

By comparison, the address shifting code that is inserted into the binary code of the application by the binary translator obviates the need for PTI because the address shifting code ensures against speculative accesses into the kernel address space by shifting kernel space addresses back into the user space. The penalties exacted by PTI are thereby avoided. Since the process page tables do not change for context switches, the TLBs associated with each processing core are not flushed during context switches and thus do not need to be repopulated. Embodiments in accordance with the present disclosure can mitigate the risks of the meltdown vulnerability while at the same time avoiding the performance penalties associated with PTI.

Figure 12:
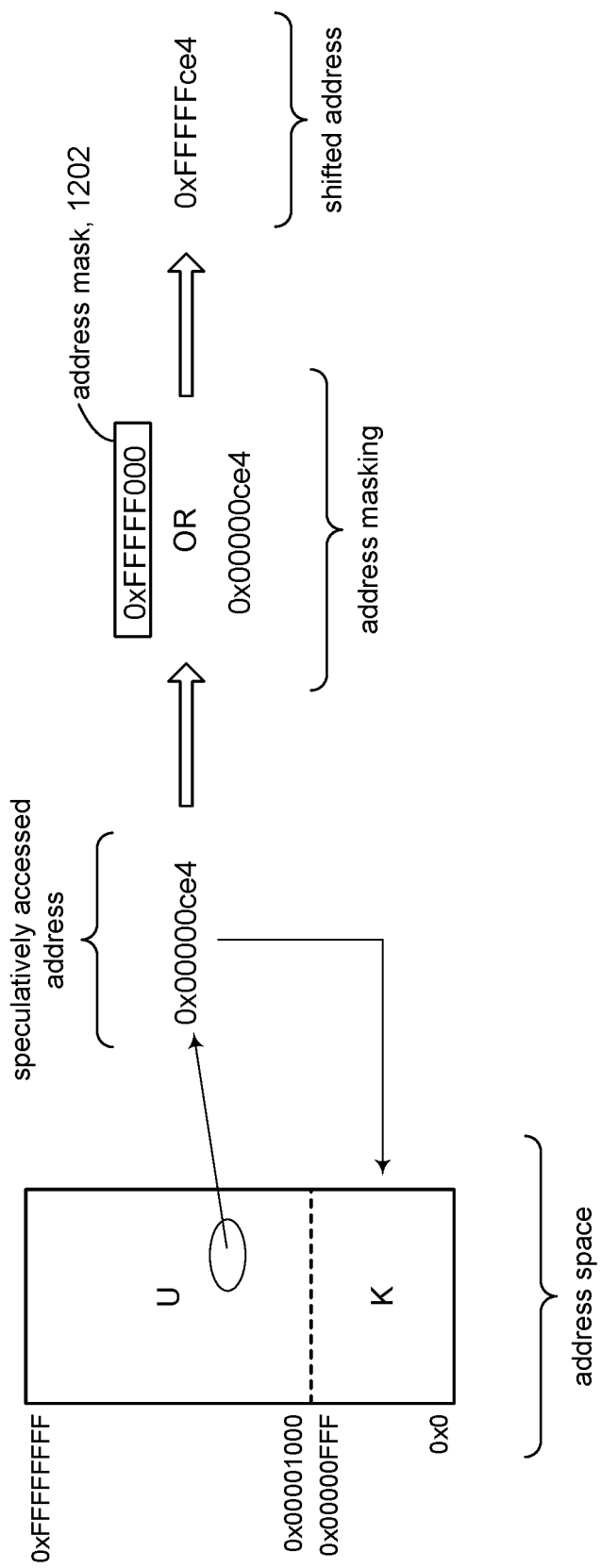
FIG. 12 shows an example of a memory model that explains the operation of the address shifting code of FIG. 11.

Referring now to FIGS. 11 and 12, in some embodiments the kernel address space can be located in lower memory. The address space shown in FIG. 12, for example, places the kernel address space in the lower range of addresses, namely in the address range from 0x0 to 0x00000FFF. The address shifting code 1102 shown in FIG. 11 applies a mask 0xFFFFF000 using an OR operation to shift the kernel space addresses upward into the user address space by masking out the high order bits of the address with 1's. Any attacks into the kernel space are deflected into the user space. It can be seen that the address mask 1202 can use values other than the value shown in FIG. 12 to shift an illegal address back into the user space.

OBSERVATIONS AND CONCLUSION

Meltdown exploits the speculative execution mechanism of the processor, tricking it to access privileged data. While speculative execution correctly prevents unprivileged processes from directly reading the speculative results, speculation has side-effects that can be observed and exploited by unprivileged processes. The meltdown proof-of-concept is able to deduce privileged data using timing attacks against data left in the cache. Future potential exploits could perhaps use other side-channels (such as counters or power). Thus, a robust defense against meltdown should eliminate speculative execution on privileged data completely.

Figure 13:
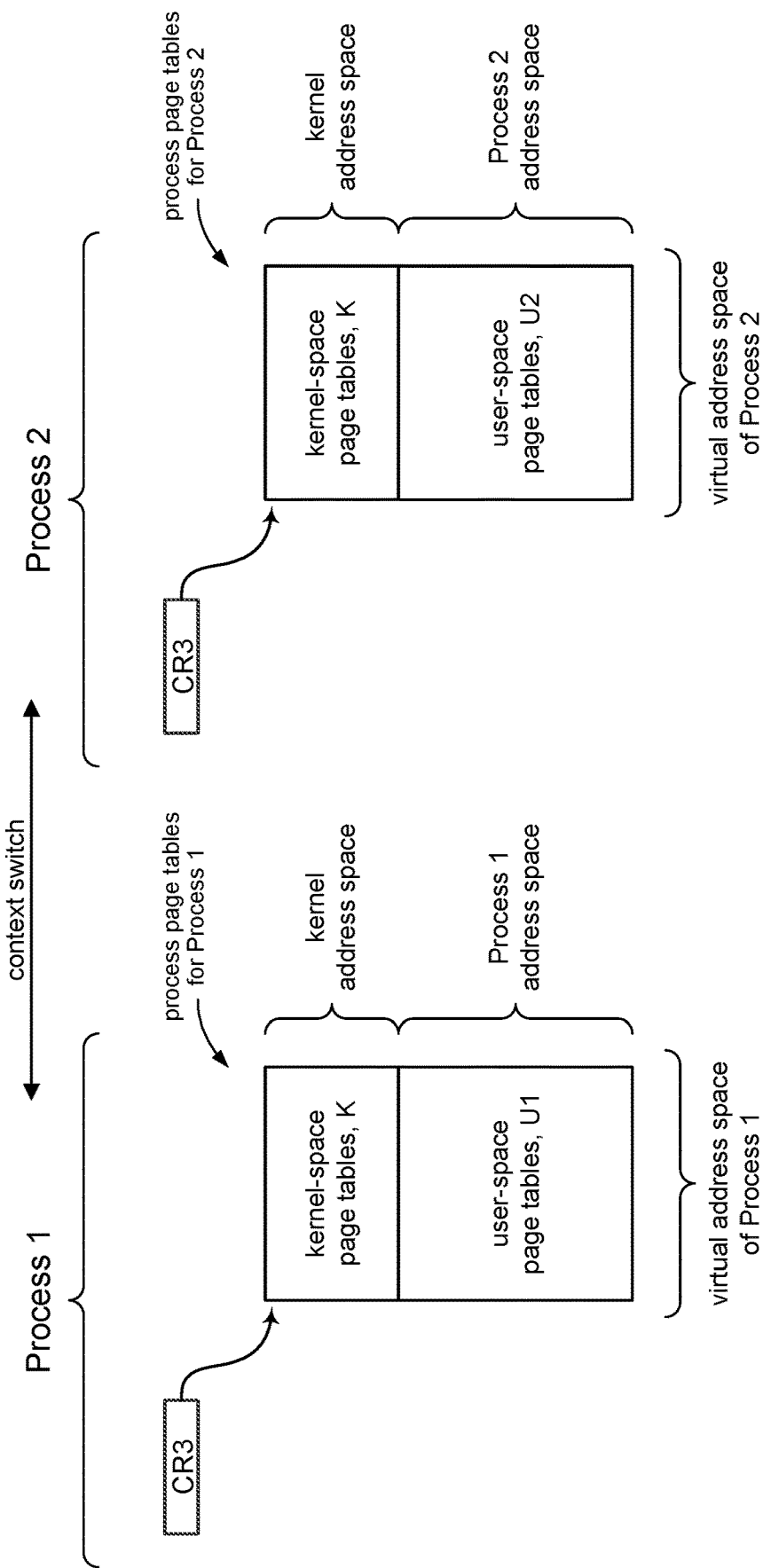
FIG. 13 illustrates kernel and user address spaces during context switching without page table isolation.

Let P be a kernel memory page that an unprivileged process U is forbidden to access. U may speculatively read P only if U has P mapped in its page table, which means there exists a virtual memory address V that U can use to refer to P. Before meltdown, V existed because OSes typically mapped P (along with the entire system memory) in the process page tables of each process; see, for example, FIG. 13. For protection, OSes relied on hardware, marking P as "supervisor" in the page table entry for P, thereby instructing the CPU to allow only the kernel to access P. OSes additionally marked P as "global", which means that the P→V mapping remains valid across context switches in the TLB used to accelerate virtual-to-physical address translations.

Figure 14:
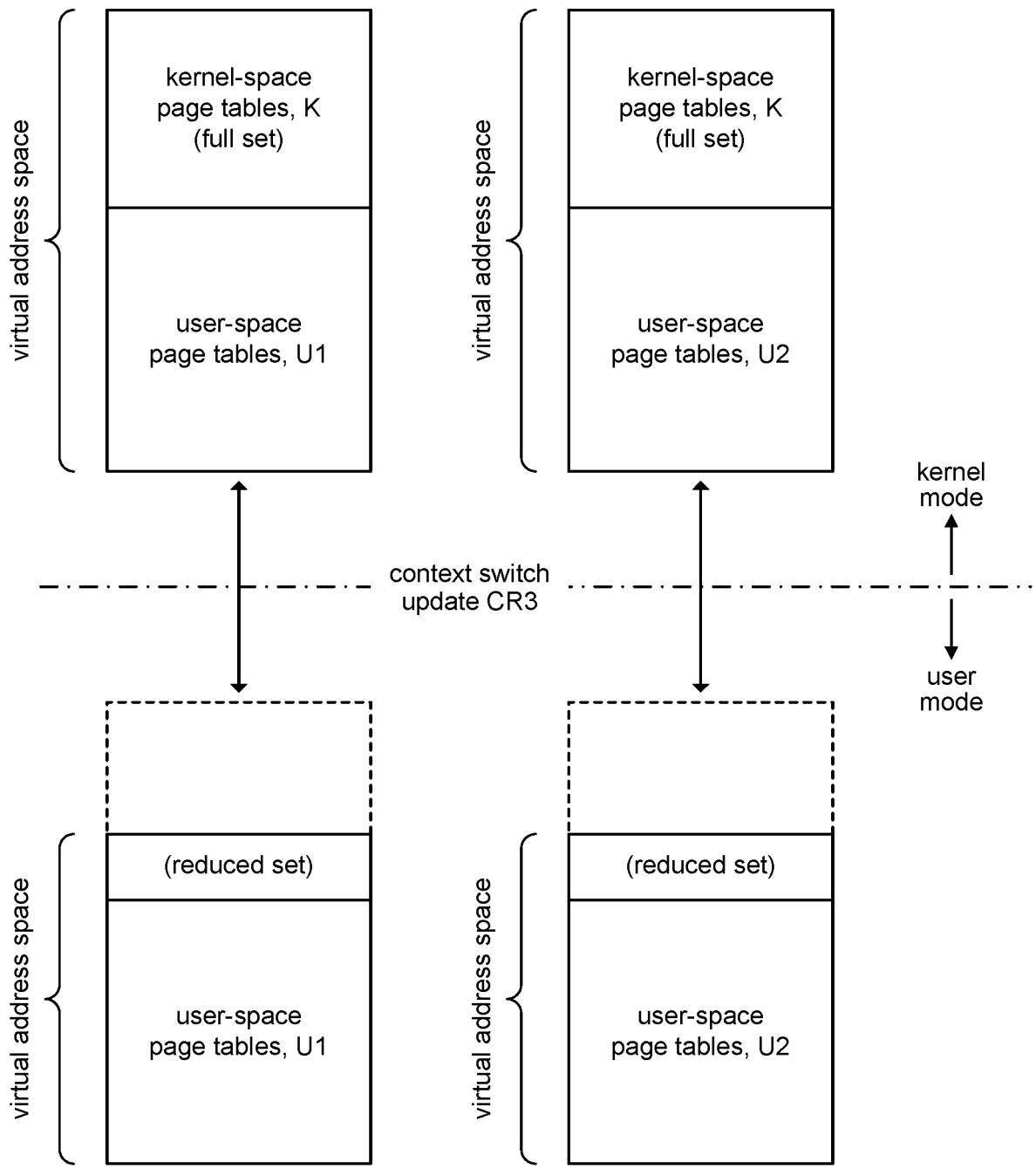
FIG. 14 illustrates kernel and user address spaces during context switching with page table isolation in accordance with the present disclosure.

Meltdown-vulnerable CPUs defer checking the supervisor bit, allowing cores to speculatively execute using privileged mappings and thereby opening a side-channel that U might exploit. Kernel page table isolation (PTI) described above addresses the problem by removing most kernel mappings from the process' virtual address space and maintaining a second, fuller virtual address space to be used by the kernel when servicing U; see, for example FIG. 14.

As explained above, the virtual address space can correspond to one PML4, which serves as the root of a page-table hierarchy that translates virtual addresses to physical addresses. The CR3 register holds the physical address of the PML4 of the currently running process. A context switch includes storing a new address into CR3, causing non-global TLB entries to be flushed. Before PTI, the OS kept CR3 as is when servicing system calls (or interrupts); CR3 changed only when switching from one process to another, and even then the kernel address mappings remained valid in the TLB because the kernel-space page tables did not change from one process to another (e.g., FIG. 13). In contrast, with PTI, the OS updates CR3 upon each kernel entry and exit, for every system call (e.g., FIG. 14), and no global mappings are used so as to defend against meltdown. The user's PML4 (i.e., process page tables) only allows access to the minimal kernel-space page tables needed, notably to enter the kernel ("trampoline") to perform interrupt handling and system call entry. The kernel's PML4, on the other hand, encompasses both user-space and kernel-space mappings.

In some embodiments, PTI-enabled and PTI-disabled PML4's for a given process can be physically contiguous, so switching between them can be done by flipping only one CR3 bit, without having to map potentially sensitive OS data. The two PML4's can point to the same user-space page tables, so that updates need only be applied once, albeit TLB invalidations must be applied twice. As noted above, updating mappings is expensive, not only in terms of the direct cost of flushing and updating the TLB, but also due to TLB misses that occur as a result from having different kernel mappings in each address space.

In summary, PTI secures the kernel from meltdown at the cost of more overhead due to switching process page tables. The overhead may have minimal impact for compute-bound workloads, but can be substantial for I/O intensive workloads that invoke system calls frequently.

Embodiments in accordance with the present disclosure avoid having to switch process page tables between context switches by avoiding the need for PTI altogether. In accordance with various embodiments, the binary translator can perform address shifting on the binary code that comprises the application to avoid meltdown by shifting addresses in memory operations that fall within the range of addresses of the kernel address space into the user address space.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method for executing an application by a central processing unit (CPU) in a computer system, the method comprising:
    accessing, by the computer system, a code page of the application from a physical memory of the computer system, the accessed code page comprising computer executable instructions to be executed by the CPU;
    rewriting, by the computer system, the accessed code page to produce a rewritten code page, including:
        copying computer executable instructions in the accessed code page to the rewritten code page; and
        in response to a computer executable instruction being a memory operation, writing address shifting code associated with the memory operation to the rewritten code page followed by writing the memory operation to the rewritten code page, wherein for each memory operation in the rewritten code page, its associated address shifting code is inserted immediately prior in sequence to that memory operation, wherein the accessed code page is marked for non-execution, wherein the rewritten code page is marked for execution; and
    executing, by the computer system, computer executable instructions in the rewritten code page instead of executing computer executable instructions in the accessed code page.

2. The method of claim 1, wherein rewriting the accessed code page further includes rewriting a memory operation to produce a replacement memory operation and writing the replacement memory operation to the rewritten code page.

3. The method of claim 1, wherein rewriting the accessed code page to produce a rewritten code page occurs in response to a first occurrence of an access to a computer executable instruction in the accessed code page.

4. The method of claim 1, wherein, for each memory operation, its associated address shifting code masks out a range of addresses that belong to a kernel address space in a virtual address space of the computer executable machine instructions to prevent access to a kernel address space by that memory operation.

5. A non-transitory computer-readable storage medium having stored thereon computer executable instructions, which when executed by a computer device, cause the computer device to:
    access a code page of the application from a physical memory of the computer system, the accessed code page comprising computer executable instructions to be executed by the CPU;
    rewrite the accessed code page to produce a rewritten code page, including:
        copying computer executable instructions in the accessed code page to the rewritten code page; and
        in response to a computer executable instruction being a memory operation, writing address shifting code associated with the memory operation to the rewritten code page followed by writing the memory operation to the rewritten code page, wherein for each memory operation in the rewritten code page, its associated address shifting code is inserted immediately prior in sequence to that memory operation, wherein the accessed code page is marked for non-execution, wherein the rewritten code page is marked for execution; and
    execute computer executable instructions in the rewritten code page instead of executing computer executable instructions in the accessed code page.

6. The non-transitory computer-readable storage medium of claim 5, wherein rewriting the accessed code page further includes rewriting a memory operation to produce a replacement memory operation and writing the replacement memory operation to the rewritten code page.

7. The non-transitory computer-readable storage medium of claim 5, wherein rewriting the accessed code page to produce a rewritten code page occurs in response to a first occurrence of an access to a computer executable instruction in the accessed code page.

8. The non-transitory computer-readable storage medium of claim 5, wherein, for each memory operation, its associated address shifting code masks out a range of addresses that belong to a kernel address space in a virtual address space of the computer executable machine instructions to prevent access to a kernel address space by that memory operation.

9. An apparatus comprising:
    one or more computer processors; and
    a computer-readable storage medium comprising instructions for controlling the one or more computer processors to be operable to:
    access a code page of the application from a physical memory of the computer system, the accessed code page comprising computer executable instructions to be executed by the CPU;
    rewrite the accessed code page to produce a rewritten code page, including:
        copying computer executable instructions in the accessed code page to the rewritten code page; and
        in response to a computer executable instruction being a memory operation, writing address shifting code associated with the memory operation to the rewritten code page followed by writing the memory operation to the rewritten code page, wherein for each memory operation in the rewritten code page, its associated address shifting code is inserted immediately prior in sequence to that memory operation, wherein the accessed code page is marked for non-execution, wherein the rewritten code page is marked for execution; and
    execute computer executable instructions in the rewritten code page instead of executing computer executable instructions in the accessed code page.

10. The apparatus of claim 9, wherein rewriting the accessed code page further includes rewriting a memory operation to produce a replacement memory operation and writing the replacement memory operation to the rewritten code page.

11. The apparatus of claim 9, wherein rewriting the accessed code page to produce a rewritten code page occurs in response to a first occurrence of an access to a computer executable instruction in the accessed code page.

12. The apparatus of claim 9, wherein, for each memory operation, its associated address shifting code masks out a range of addresses that belong to a kernel address space in a virtual address space of the computer executable machine instructions to prevent access to a kernel address space by that memory operation.

* * * * *